United States Patent
Pankey

(10) Patent No.: US 9,709,276 B2
(45) Date of Patent: Jul. 18, 2017

(54) METHOD AND TOOL FOR INSTALLATION OF A TRANSITION DUCT

(71) Applicant: Siemens Energy, Inc., Orlando, FL (US)

(72) Inventor: William W. Pankey, Palm Beach Gardens, FL (US)

(73) Assignee: Siemens Energy, Inc., Orlando, FL (US)

( * ) Notice: Subject to any disclaimer, the term of this patent is extended or adjusted under 35 U.S.C. 154(b) by 455 days.

(21) Appl. No.: 14/471,553

(22) Filed: Aug. 28, 2014

(65) Prior Publication Data

US 2016/0061449 A1 Mar. 3, 2016

(51) Int. Cl.
*F01D 25/28* (2006.01)
*F23R 3/02* (2006.01)
*F02C 7/20* (2006.01)
*F01D 9/02* (2006.01)
*F23R 3/60* (2006.01)
*B23P 19/12* (2006.01)

(52) U.S. Cl.
CPC ............... *F23R 3/02* (2013.01); *F01D 9/023* (2013.01); *F01D 25/285* (2013.01); *F02C 7/20* (2013.01); *F23R 3/60* (2013.01); *B23P 19/12* (2013.01); *B23P 2700/13* (2013.01); *F05D 2230/60* (2013.01); *F05D 2230/644* (2013.01); *F05D 2230/68* (2013.01); *F23R 2900/00017* (2013.01)

(58) Field of Classification Search
CPC    B23P 6/005; B23P 19/10; B23P 19/12; B23P 2700/13; F01D 25/285; F05D 2230/60; F05D 2230/64; F05D 2230/644; F05D 2230/68
See application file for complete search history.

(56) References Cited

U.S. PATENT DOCUMENTS

2011/0000080 A1* 1/2011 Arase ...................... F01D 9/023
29/700

* cited by examiner

*Primary Examiner* — Christopher Besler

(57) ABSTRACT

In a method for installation of a transition duct in a gas turbine engine, a guide structure is positioned that extends in an inclined direction with respect to a gas turbine axis. At least a portion of the guide structure is disposed between a turbine section and a combustor section of the gas turbine engine. The transition duct is engaged with the guide structure such that the transition duct is movable along the guide structure. Motion is imparted to the transition duct along the guide structure in a forward-to-aft direction, to move the transition duct to an installed position in which an aft end of the transition duct is aligned for attachment to a forward face of a stator component of the turbine section.

14 Claims, 4 Drawing Sheets

METHOD AND TOOL FOR INSTALLATION OF A TRANSITION DUCT

BACKGROUND

1. Field

Embodiments of the present invention relate generally to gas turbine engines, and in particular, to a method and a tool for installing a transition duct in a gas turbine engine.

2. Description of the Related Art

A conventional gas turbine engine includes a compressor section, a combustion section including a plurality of combustors, and a turbine section. Ambient air is compressed in the compressor section and conveyed to the combustors in the combustion section. The combustors combine the compressed air with a fuel and ignite the mixture creating combustion products defining hot working gases that flow in a turbulent manner and at a high velocity. The working gases are routed to the turbine section via a plurality of transition ducts. Within the turbine section are rows of stationary vane assemblies and rotating blade assemblies. The rotating blade assemblies are coupled to a turbine rotor. As the working gases expand through the turbine section, the working gases cause the blades assemblies, and therefore the turbine rotor, to rotate. The turbine rotor may be linked to an electric generator, wherein the rotation of the turbine rotor can be used to produce electricity in the generator.

The transition ducts are positioned adjacent to the combustors and route the working gases from the combustors into the turbine section through turbine inlet structure associated with a first row vane assembly. The vane assembly is mounted on an annular vane carrier. The transition duct comprises an aft frame defining a transition exit that opens into the gas turbine section.

A transition duct may be assembled on the aft side by fastening the transition aft frame to a stator component of the turbine section, such as the vane carrier. Replacing a transition duct may be time consuming, difficult and a safety risk due to the environment, and the shape and weight of the transition duct itself.

Transition Duct replacement may be achieved by various methods. For example, one known method requires service personnel to manually lift and maneuver the transition duct into position through the case portal. Other techniques may involve the use of a powered manipulator for lifting, maneuvering and placement of the transition duct. Both of the above methods require service personnel to be staged both outside and inside the transition duct to complete fit-up and fastening tasks.

SUMMARY

Briefly, aspects of the present invention provide a method and a tool for installing a transition duct in a gas turbine engine.

In a first aspect, a method is provided for installation of a transition duct in a gas turbine engine. The method comprises positioning a guide structure extending in an inclined direction with respect to a gas turbine axis. The guide structure is positioned such that at least a portion of the guide structure is disposed between a turbine section and a combustor section of the gas turbine engine. The method further comprises engaging the transition duct with the guide structure such that the transition duct is movable along the guide structure. The method further comprises imparting a motion to the transition duct along the guide structure in a forward-to-aft direction, to move the transition duct to an installed position in which an aft end portion of the transition duct is aligned for attachment to a forward face of a stator component of the turbine section.

In a second aspect, a transition duct installation tool for a gas turbine engine is provided. The tool comprises a guide structure, at least part of which is disposed between a turbine section and a combustor section of the gas turbine engine. The guide structure extends in an inclined direction with respect to a gas turbine axis. The tool further comprises a movable connection between the guide structure and the transition duct that allows movement of the transition duct along the guide structure in a forward-to-aft direction. The guide structure is positioned in a manner to enable the transition duct to be moved along the guide structure to an installed position in which an aft end portion of the transition duct is aligned for attachment to a forward face of a stator component of the turbine section.

BRIEF DESCRIPTION OF THE DRAWINGS

The invention is shown in more detail by help of figures. The figures show preferred configurations and do not limit the scope of the invention.

DETAILED DESCRIPTION

Figure 1:
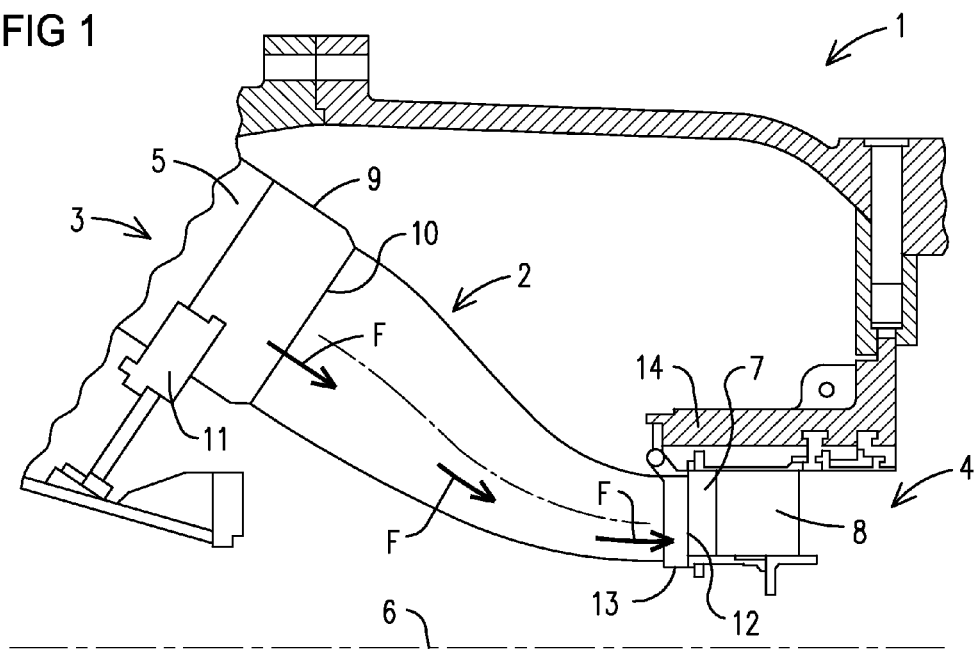
FIG. 1 illustrates a side elevation view of a portion of a gas turbine engine including a transition duct extending from a combustor to the entrance to a turbine section, in accordance with one embodiment.

Embodiments of the present invention illustrated herein provide a method and tool for installation of a transition duct in a gas turbine engine. The illustrated embodiments may provide improvements to the existing transition duct replacement procedure that allow the transition duct replacement to be completed from outside the engine.

As used in this Specification, the terms "forward" and "aft" are defined in relation to the direction of flow of the working medium, wherein forward refers to a relative upstream position and aft refers to a relative downstream position. The flow direction is indicated by the reference sign F in the drawings.

Referring to FIG. 1, a portion of a gas turbine engine 1 is illustrated, including a transition duct 2 extending from a combustor section 3 to the entrance of a turbine section 4.

The combustor section 3 may include, for example, a plurality of combustors 5 arranged in a circular arrangement about a turbine axis 6. Only one such combustor 5 is shown in FIG. 1. Each combustor 5 comprises a combustion zone wherein a working medium is produced by combustion of a mixture of fuel and an oxidant, such as compressed air from a compressor section (not shown) of the gas turbine engine 1. Each combustor 5 has a respective transition duct 2 attached thereto that provides a conduit for conveying the working medium comprising hot combustion gases from the combustor 5 to the entrance 7 of a turbine assembly, where the gases are directed toward a first row of stationary vanes 8 arranged on an annular shaped turbine vane carrier (TVC) 14. An inlet ring 9 may be provided at an inlet end 10 of the transition duct 2. The inlet ring 9 may have, for example, a generally circular cross-section. The inlet ring 9 may be supported by an inlet support or a forward mount 11. An outlet end 12 of the transition duct 2 may include a transition aft frame 13. In the illustrated example, the aft frame 13 has a generally rectangular or trapezoidal arc-like shape. In accordance with the illustrated embodiments, the gas turbine engine 1 is provided with a can-annular configuration. The transition duct 2 in this example has a geometric profile that transitions from a generally circular cross-section, substantially corresponding to the shape of the outlet from the combustor 5, to a generally trapezoidal or rectangular arc-like cross-section at the turbine entrance 7, while also defining a radially inwardly extending path for the gas flow. The transition duct 2 is attached to the turbine section 4 by fastening the transition aft frame 13 to a stator (i.e., stationary) component of the turbine section 4. In the illustrated embodiment, the transition aft frame 13 is fastened to the TVC 14. In an alternate embodiment, the transition aft frame 13 may be fastened to another stator component, such as a casing. The transition aft frame 13 may be cast together with the transition duct 2, or may be manufactured separately and welded to the transition duct at the outlet end.

Figure 2:
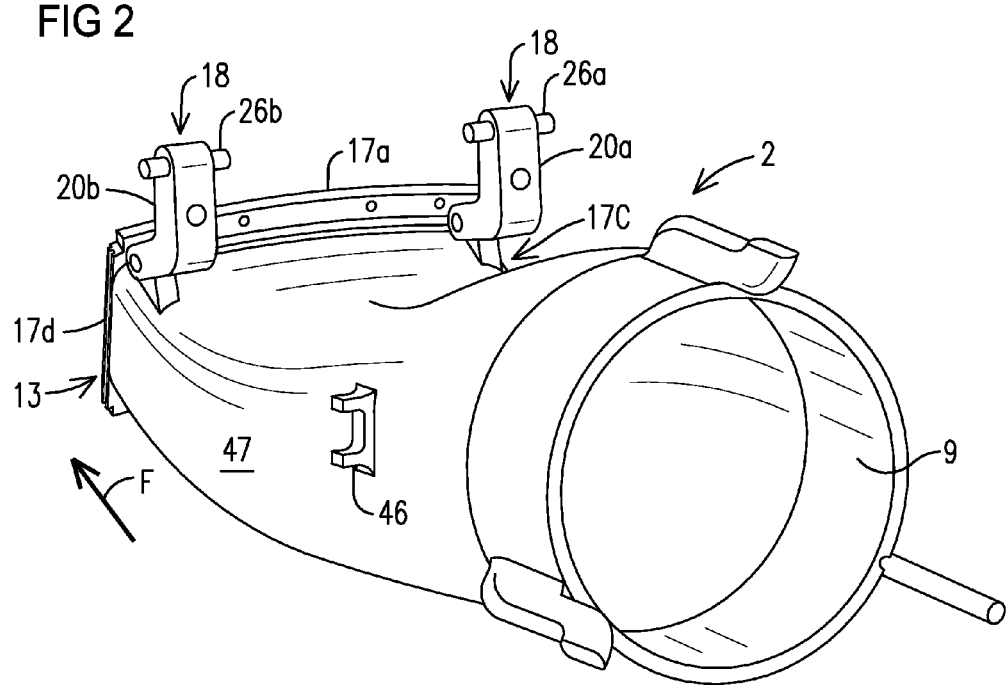
FIG. 2 illustrates a perspective view of a transition duct in accordance with one embodiment.

FIG. 2 illustrates a perspective view of a transition duct 2 according to one embodiment. The profile of the transition duct changes from generally circular at the forward end to a rectangular arc like shape at the aft end. The inlet ring 9 corresponds to the generally circular shape at the forward end, while the transition aft frame 13 corresponds to the rectangular arc like shape at the aft end. The transition aft frame 13 is provided with attachment structures 18*a*, 18*b* that engage in corresponding connection points 21*a*, 21*b* (visible in FIG. 3) provided on a forward face 22 of the stator component 14, which in this example is the TVC. In this example, the attachment structures 18*a*-*b* comprise links 20*a*, 20*b*, which are capable of being fastened to the forward face 22 of the TVC 14 at the respective connection points 21*a*, 21*b*.

Figure 3:
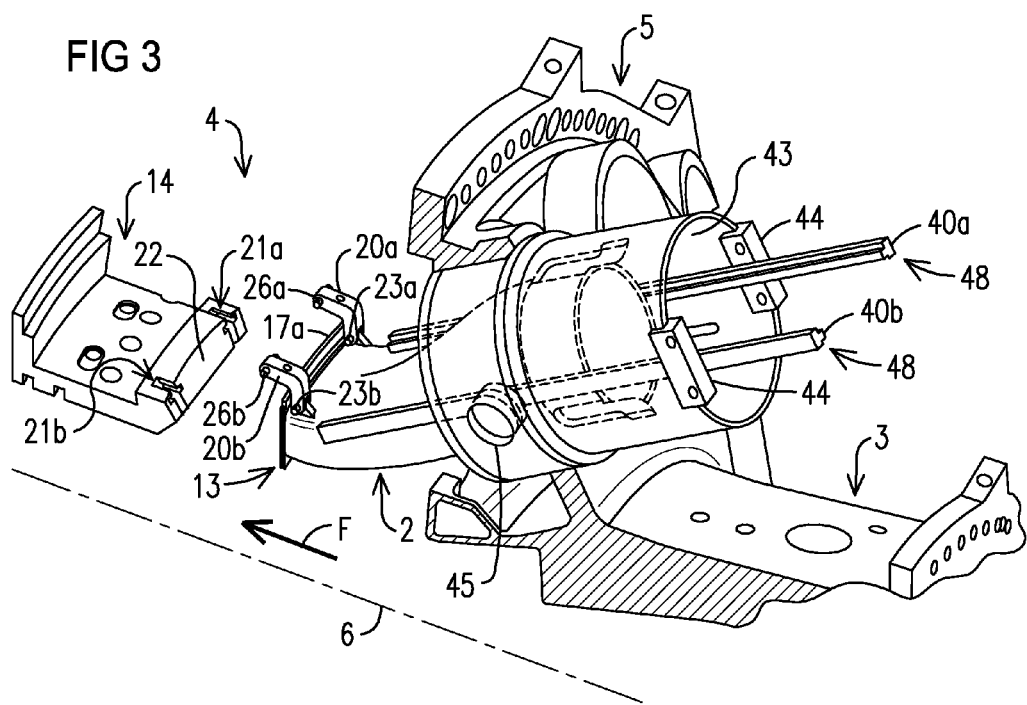
FIG. 3 illustrates a perspective view of a transition duct installation arrangement according to one embodiment, in which the guide structure has been positioned and the transition duct has been movably engaged to the guide structure.
Figure 4:
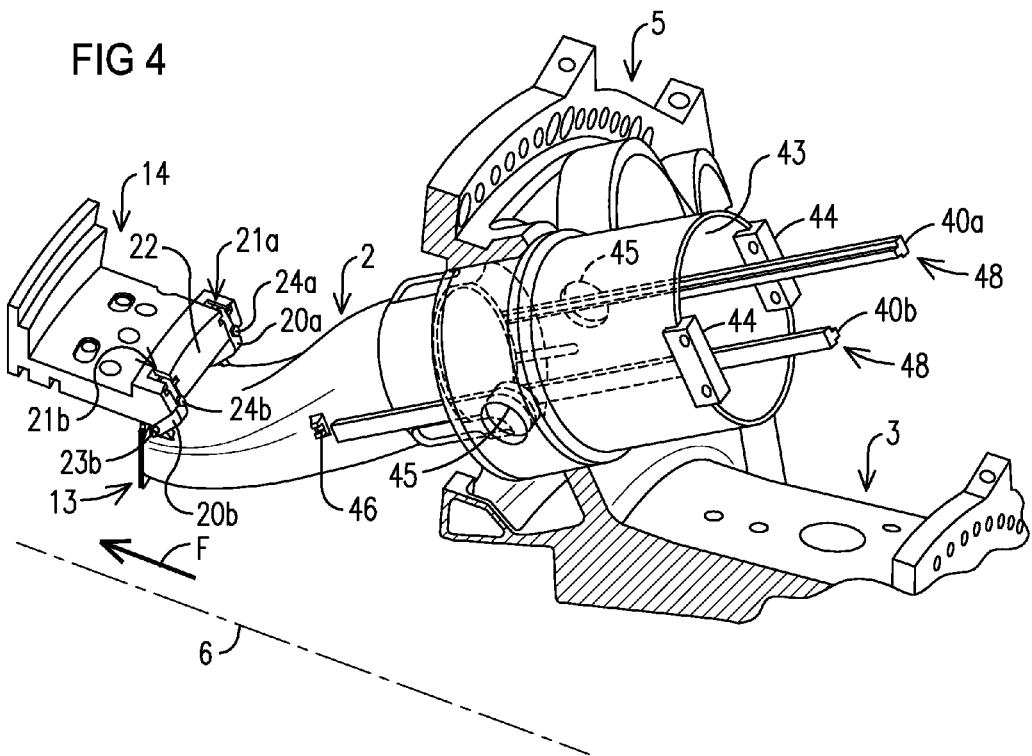
FIG. 4 illustrates a perspective view of a transition duct installation arrangement according to one embodiment, in which the transition duct has been fully installed, prior to the removal of the guide structure.
Figure 5:
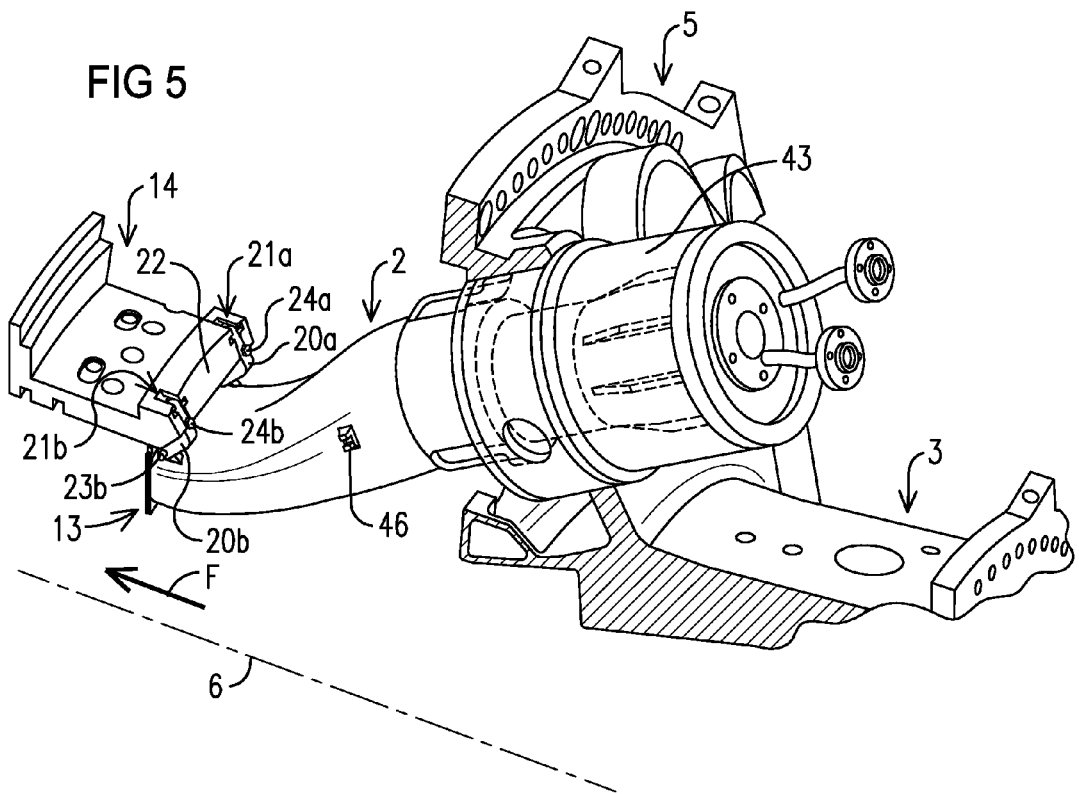
FIG. 5 illustrates a perspective view of a transition duct installation arrangement according to one embodiment, when the guide structure has been removed and the combustor has been installed.

Referring to FIG. 3-5 an exemplary method for installing a transition duct 2 utilizing an inventive transition duct installation tool is illustrated.

As shown in the drawings, the exemplary transition duct installation tool comprises a guide structure 40*a*-*b* for guiding the transition duct 2 to an installed position along an inclined direction (i.e., not parallel to) with respect to the turbine axis 6. As shown, at least a part of the guide structure 40*a*-*b* is disposed between the combustor section 3 and the turbine section 4. The positioning of the guide structure 40*a*-*b* is established so as to allow transition duct 2 to be moved along the guide structure 40*a*-*b* to an installed position in which an aft end portion of the transition duct 2 (i.e., the transition aft frame 13 in this example) is aligned for attachment to the forward face 22 of the TVC 14. To this end, the installation tool comprises a movable connection between the guide structure 40*a*-*b* and the transition duct 2 that allows movement of the transition duct 2 along the guide structure in a forward-to-aft direction along the incline, as indicated by the arrow 42. In the illustrated example, the guide structure comprises a pair of rails or tracks 40*a* and 40*b*. The rails or tracks 40*a* and 40*b* are shown to extend generally parallel to each other along the inclined direction 42. The inclined direction 42 may be parallel to the axis of the transition duct in the assembled state.

In the illustrated embodiments, the rails or tracks 40*a*-*b* may be positioned by attaching them to the combustor section 3, particularly to a sleeve 43 of a respective combustor 5 to which the transition duct 2 is connected. The sleeve 43 refers to a thick-walled cylindrical section that bounds the internal and external regions of the case of the combustor 5. The sleeve 43 forms the inner wall of the combustion zone. The combustor sleeve, together with the end plate, is sometimes called a top-hat. The most outboard end of the combustor 5 attaches to the inner face of the top hat.

In the illustrated embodiments, the sleeve 43 may be installed onto the casing of the combustor 5, prior to installing the transition duct 2 to allow the transition duct fingers to rest on the inner diameter of the sleeve 43, to center the transition duct 2.

In an alternate embodiment, the rails or tracks 40*a*-*b* could be attached to the casing of the combustor 5 prior to installing the sleeve 43. In this case, the rails or tracks 40*a*-*b* may not be as rigidly secured as when they were attached to the sleeve 43.

In the shown example, the rails or tracks 40*a*-*b* are fastened to opposite sides of the sleeve 43. The rails or tracks 40*a*-*b* are secured on each side of the combustor sleeve 43 by a two point attachment at clamping locations designated as 44 and 45. The location 44 may correspond to an outboard end of the sleeve 43, while the location 45 may correspond to a bore in the case provided for a cross-over tube of the combustor section 3. A can-annular combustor generally comprises a plurality of combustors 5 arranged in a circle. A cross-over tube is a conduit that interconnects adjacent combustors in a can annular arrangement, for example for providing an ignition of the flame in one combustor from the flame produced in an adjacent combustor.

In the present embodiment, the movable connection between the transition duct 2 and the rails or tracks 40*a*-*b* comprises a bracket 46 disposed on an outer surface 47 of the transition duct 2. This is shown in FIG. 2. In this example, two brackets 46 may be disposed on diametrically opposite sides on the outer surface 47 of the transition duct 2, only one of them being visible in FIG. 2. The brackets 46 may be formed integral to the transition duct 2.

In the illustrated embodiment, the brackets 46 engage slidably with the rails or tracks 40*a*-*b*, allowing sliding translation motion of the transition duct 2 along the rails or tracks 40*a*-*b*. In the example, the brackets 46 have a C-shaped cross-section, while the rails 40*a*-*b* have corresponding a T-shaped cross-section, wherein a central rib of the T-shaped cross-section of a rail engages within a central recess in the C-shaped cross-section of a respective bracket. The inventive concept is however not limited by the specific shapes described herein. In the present example, the brackets 46 are disposed on the outer surface 47 of the transition duct 2 at locations that correspond to the center of mass of the transition ducts, to permit sliding along the rails with minimal handling forces.

In an alternate embodiment, the movable connection between the transition duct 2 and the rails or tracks 40a-b comprise wheels or rollers provided on the transition duct, which are capable of rolling along the rails or tracks 40a-b.

FIG. 3 illustrates a perspective view of a transition duct installation arrangement according to one embodiment, in which the rails or tracks 40a-b have been fastened to the combustor sleeve 43 at clamping locations 44 and 45. The transition duct 2 is shown to be slidably engaged to the rails or tracks 40a-b via the brackets 46. The transition duct 2 may be engaged to the rails or tracks 40a-b from the forward end 48 of the rails or tracks 40a-b. To this end the forward end 48 of the rails or tracks 40a-b extend beyond the combustor sleeve 43, so that there is no obstruction while the transition duct 2 is being engaged to the rails or tracks 40a-b via from the forward end 48.

Once engaged to the rails or tracks 40a-b, the transition duct 2 is imparted a transition motion along the inclined rails or tracks 40a-b to move the transition duct 2 towards the installed position. The motion may be imparted manually or by powered devices such as manipulators. As the motion is imparted, the transition duct 2 moves along the incline 42 in a forward-to-aft direction till it reaches the final installed position in which an aft end portion of the transition duct 2 is aligned for attachment to a forward face 22 of the TVC 14. In particular, with respect to the illustrated example, the installed position is one in which the links 20a-b of the transition aft frame 13 are aligned to be engaged with corresponding connection points 21a-b on the forward face 22 of the TVC 14.

As shown in FIG. 4, after the transition duct 2 is moved to the final installation position along the rails or tracks 40a-b, the links 20a-b are fastened to the connection points 21a-b, for example by way of retention bolts 24a-b.

In the illustrated example, the connection points 21a-b are spaced apart circumferentially on the forward face 22 of the TVC 14. The links 20a-b are arranged correspondingly spaced apart on a radially outer panel 17a of the transition aft frame 13. The spacing of the links 20a-b provides better moment control by transferring moment load to the side panels 17c, 17d (visible in FIG. 2) of the transition aft frame 13. This constrains rotation of the transition duct 2 about its axis and prevents cracks from being formed on the outer diameter surface of the transition duct 2. The forward end of the links 20a-b are pivoted to the outer panel 17a by pins 23a-b so that the links 20a-b are rotatable about a tangential axis. The aft end of the links 20a-b may comprise pins 26a-b oriented in a tangential direction.

In this example, the connection points 21a-b on the forward face of the TVC 14 comprises slots, correspondingly shaped to receive the links 20a-b of the transition aft frame.

Figure 7:
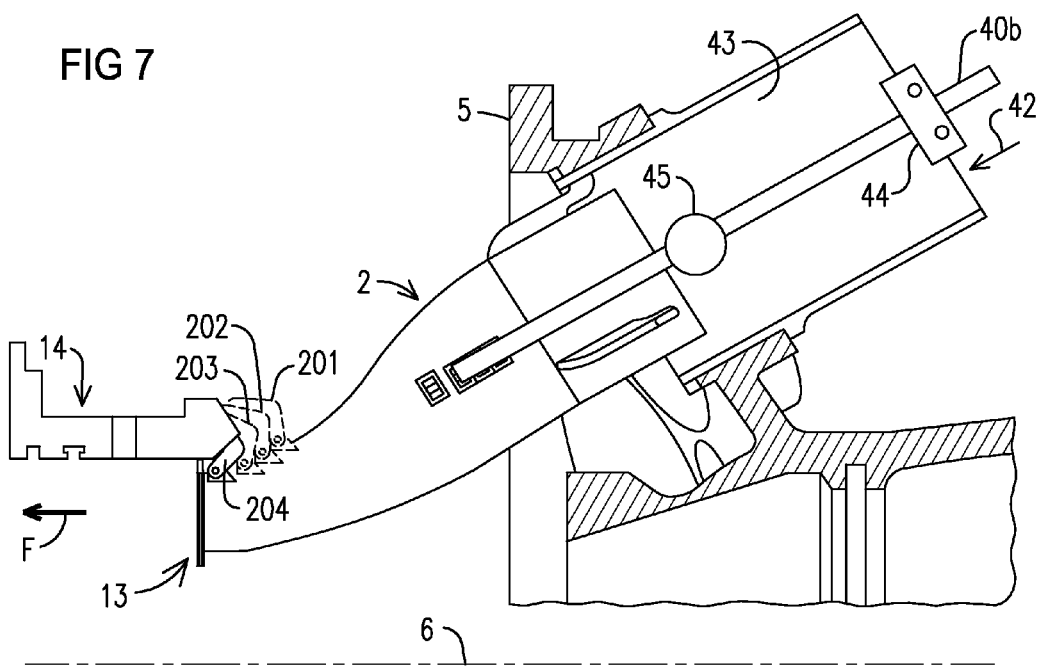
FIG. 7 illustrates, in a perspective side view, an installation sequence for attaching an aft end portion of the transition duct to a stator component of the turbine section.

FIG. 7 illustrates, in a perspective side view, an approach sequence for attaching the transition frame 13 to the forward face of the TVC 14. The numerals 201, 202, 203, 204 illustrate successive positions of the links 20a-b during installation. In the illustrated approach sequence, the transition duct 2 approaches the TVC 14 with the links 20a-b rotated to aft position, as shown in FIG. 5. Subsequently, the pins 26a-b at the aft end of the links 20a-b engage in the respective slots 21a-b on the forward face 22 of the TVC 14. The engagement of the pins 26a-b in the slots 21a-b continues until the pins 26a-b reach the end of the respective slots 21a-b. After the engagement of the pins 26a-b to slots 21a-b, the links 20a-b begin to rotate about the tangential axis defined by the center of the pins 23a-b. This rotation continues until the respective link face mates with the floor of the respective slots 21a-b, such that a bolt hole on the respective link 20a-b aligns with a corresponding bolt hole on the floor of the respective slot 21a-b. Bolts 24a-b are inserted through the aligned bolt holes on the links 20a-b and the slots 21a-b, to tightly secure the links transition aft frame 13 to the TVC 14.

The illustrated assembly sequence thus transitions from an inclined approach, till the point at which the pins 26a-b engage in the slots 21a-b. Thereafter, an axial approach (along turbine axis 6) is facilitated by the rotation of the links 20a-b about the tangential axis When the transition duct 2 has been installed at the aft end by fastening the transition aft frame 13 to the TVC 14, the rails or tracks 40a-b may be removed from their position and the rest of the combustor 5 may be subsequently installed, as shown in FIG. 5.

Figure 6:
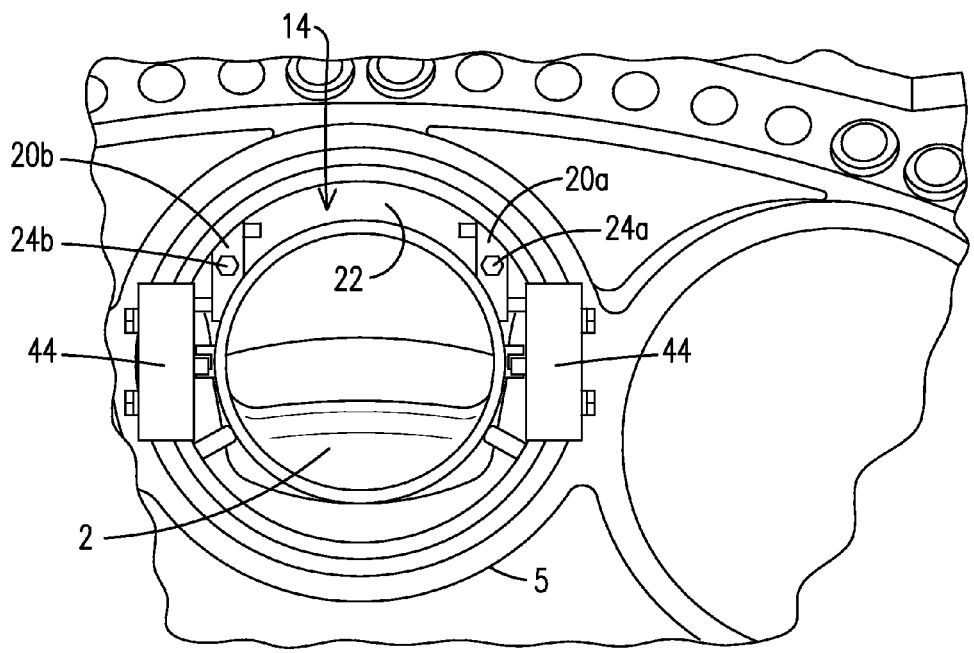
FIG. 6 illustrates a forward end view of a transition duct installed in accordance with the illustrated embodiments.

FIG. 6 illustrates a forward end view of the transition duct 2 which has been installed in accordance with the illustrated embodiments. As shown, a direct line of sight access to the transition duct retention bolts 24a-b is provided from outside the engine. Thereby, using the present installation technique, it is possible to complete the transition duct replacement procedure from outside the engine.

The illustrated embodiments may reduce time, effort and risk associated with transition duct replacement. In the state of the art procedure, a portion of the time allotted to transition duct replacement is attributed to waiting for the engine to cool enough to allow service personnel to enter inside the engine. The embodiments herein provide a modification of the existing transition duct replacement procedure to allow all combustor and transition duct replacement to be completed from outside the engine. Time spent for waiting for the engine to be cooled may be saved in the process.

Figure 8:
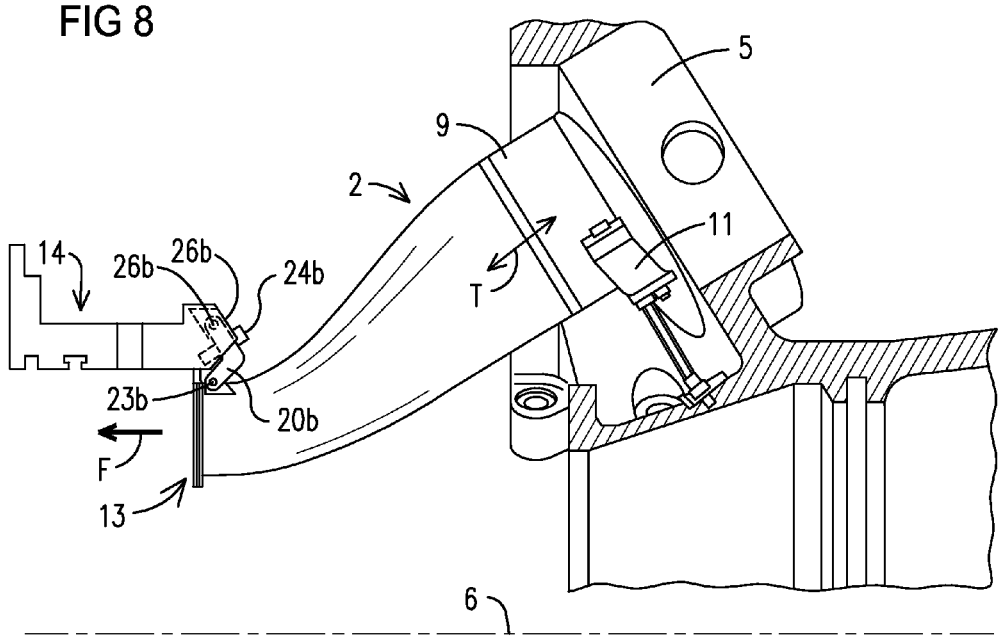
FIG. 8 illustrates a side view of an assembled transition duct according to one embodiment.

FIG. 8 illustrates a side view of an assembled transition duct 2 according to the illustrated embodiments. When installed, the links 20a-b of the transition aft frame 13 of the transition duct 2 provide axial radial and circumferential constraint, while allowing rotation about a tangential axis, defined by the center of the pins 23a-b. Circumferential spacing between the links 20a-b constrains rotation of the duct about its axis and provides better moment control by transferring moment load to the side panels of the transition aft frame 13. At its forward end, the transition duct 2 may be mounted to the combustor 5 by a forward mount 11 that comprises radially oriented struts which provide radial and circumferential constraint while allowing translation along the transition duct axis (denoted by double arrow T) to accommodate thermal growth in the transition duct.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

What is claimed is:

1. A method for installation of a transition duct in a gas turbine engine, comprising:
   positioning a guide structure extending in an inclined direction with respect to a gas turbine axis, wherein at least a portion of the guide structure is disposed between a turbine section and a combustor section of the gas turbine engine,
   engaging the transition duct with the guide structure such that the transition duct is movable along the guide structure, and imparting a motion to the transition duct along the guide structure in a forward-to-aft direction, to move the transition duct to an installed position in which an aft end portion of the transition duct is aligned for attachment to a forward face of a stator component of the turbine section, wherein an aft frame of the transition duct comprises attachment structures, each attachments structure having a link with a tangential pin that engages in a respective slot on the forward face of the stator, wherein each pin is rotatable about a tangential axis, such that said motion transitions from the inclined direction in relation to the turbine axis to an axial direction in relation to the turbine axis facilitated by the rotation of the pins about the tangential axis.

2. The method according to claim 1, wherein the guide structure comprises a track or a rail.

3. The method according to claim 1, wherein the transition duct is engaged slidably to the guide structure.

4. The method according to claim 3, wherein the transition duct is provided with a bracket on an outer surface of the transition duct, for slidably engaging with the guide structure.

5. The method according to claim 4, wherein the bracket is disposed at a location that corresponds to a center of mass of the transition duct.

6. The method according to claim 1, wherein the guide structure is positioned by securing the guide structure to the combustor section.

7. The method according to claim 6, wherein the guide structure is secured to a sleeve of a combustor in the combustor section.

8. The method according to claim 7, wherein the guide structure comprises a pair or rails or tracks that are positioned by attaching said rails or tracks to diametrically opposite sides of the combustor sleeve.

9. The method according to claim 8, wherein a first attachment point of the sleeve with the rails or tracks is located at an outboard end of the sleeve.

10. The method according to claim 8, wherein a second attachment point of the sleeve with the rails or tracks is located at a bore in a case provided for a cross-over tube of the combustor section.

11. The method according to claim 8, wherein after being positioned, the aft ends of the rails or tracks extend beyond the sleeve of the combustor.

12. The method according to claim 1, further comprising bolting the aft end portion of the transition duct to the forward face of the stator component of the turbine section after the transition duct is moved along the guide track to said installed position.

13. The method according to claim 12, further comprising removing the rails after aft end portion of the transition duct has been bolted to the forward face of the stator component of the turbine section.

14. The method according to claim 1, wherein the stator component is a turbine vane carrier.

* * * * *